United States Patent
Chung et al.

(10) Patent No.: US 8,559,883 B2
(45) Date of Patent: Oct. 15, 2013

(54) WIRELESS DEVICE AND SIGNAL PATH CONFIGURATION METHOD THEREOF

(75) Inventors: Chang Gwon Chung, Hwaseong-si (KR); Hyun Seok Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 12/882,475

(22) Filed: Sep. 15, 2010

(65) Prior Publication Data

US 2011/0065392 A1  Mar. 17, 2011

(30) Foreign Application Priority Data

Sep. 16, 2009 (KR) .................. 10-2009-0087572

(51) Int. Cl.
*H04B 17/00* (2006.01)
(52) U.S. Cl.
USPC .................. 455/67.11; 455/67.14; 455/188.1; 455/115.1; 342/417
(58) Field of Classification Search
USPC .......... 455/67.11, 67.14, 188.1, 115.1, 115.4, 455/562.1, 168.1; 342/417
See application file for complete search history.

(56) References Cited

U.S. PATENT DOCUMENTS

| | | | | |
|---|---|---|---|---|
| 6,084,545 A * | 7/2000 | Lier et al. | ...................... | 342/360 |
| 6,128,474 A * | 10/2000 | Kim et al. | .................. | 455/67.11 |
| 6,163,296 A * | 12/2000 | Lier et al. | ...................... | 342/417 |
| 6,208,287 B1 * | 3/2001 | Sikina et al. | .................. | 342/174 |
| 6,252,542 B1 * | 6/2001 | Sikina et al. | .................. | 342/174 |
| 6,456,675 B2 * | 9/2002 | Wagner et al. | ................. | 375/347 |
| 6,549,078 B1 * | 4/2003 | Sridharan et al. | ................ | 331/17 |
| 6,573,864 B2 * | 6/2003 | Sanada et al. | ................. | 342/383 |
| 6,771,057 B1 * | 8/2004 | Raddant | ..................... | 324/76.26 |
| 7,254,379 B2 * | 8/2007 | Xu et al. | ........................ | 455/296 |
| 7,289,924 B2 * | 10/2007 | Muniraju et al. | .............. | 702/107 |
| 7,339,367 B2 * | 3/2008 | Heisler et al. | ................. | 324/115 |
| 7,366,508 B2 * | 4/2008 | Hasegawa et al. | ............ | 455/424 |
| 2004/0266483 A1 * | 12/2004 | Choi | .......................... | 455/562.1 |
| 2009/0153382 A1 * | 6/2009 | Philips | ......................... | 341/143 |
| 2010/0075594 A1 * | 3/2010 | Kim et al. | ......................... | 455/7 |
| 2011/0090774 A1 * | 4/2011 | Hsu et al. | .................. | 369/47.19 |
| 2012/0027066 A1 * | 2/2012 | O'Keeffe | ...................... | 375/224 |
| 2012/0050094 A1 * | 3/2012 | Nakabayashi et al. | ........ | 342/174 |
| 2012/0113828 A1 * | 5/2012 | Head et al. | .................... | 370/252 |

* cited by examiner

*Primary Examiner* — Minh D Dao
(74) *Attorney, Agent, or Firm* — Jefferson IP Law, LLP

(57) ABSTRACT

A signal path configuration method and apparatus of a wireless device are provided for avoiding radiation performance degradation caused by holding a specific part of the wireless device. A wireless device of the present invention includes a Radio Frequency (RF) unit that includes a plurality of antennas, an RF connector for RF calibration, and a detection unit for detecting connection of an RF cable, a switch for switching a signal path to one of the plurality of antennas, and a control unit for distinguishing between communication modes based on a detection signal output by the detection unit and for generating a control signal for controlling the switch to connect the signal path to one of the antennas according to the communication mode.

19 Claims, 5 Drawing Sheets

WIRELESS DEVICE AND SIGNAL PATH CONFIGURATION METHOD THEREOF

PRIORITY

This application claims the benefit under 35 U.S.C. §119(a) of a Korean patent application filed on Sep. 16, 2009 in the Korean Intellectual Property Office and assigned Serial No. 10-2009-0087572, the entire disclosure of which is hereby incorporated by reference.

BACKGROUND OF THE INVENTION

1. Field of the Invention

The present invention relates to a wireless device. More particularly, the present invention relates to a signal path configuration method and apparatus of a wireless device for avoiding radiation performance degradation caused by holding the wireless device.

2. Description of the Related Art

Recent wireless devices are designed with multiband functionality for supporting automatic roaming. Also, most of the recent wireless devices are equipped with internal antennas (so called, intenna) unlike the conventional wireless devices having external antennas.

As the wireless devices are becoming slim and compact in design, the available internal space for antenna installation is being limited. For this reason, an internal antenna of a conventional wireless device is installed around the location of a microphone (MIC) which occupies a relatively large space. This means that, since most of the metallic components that may degrade the antenna performance, such as a speaker and a camera, are arranged at the upper part of the wireless device, the antenna is arranged at lower part of the wireless device to avoid performance degradation and to secure enough installation space.

However, since the lower part of the wireless device is held by a user's hand during voice communication, the radiation characteristics of the antenna are likely to be degraded due to the presence of the user's hand. That is, since it is known that the presence of a hand over an antenna will cause a loss of radiation characteristics of over 6 dB, the presence of the user's hand must negatively influence the voice and data communication qualities of the wireless device.

Accordingly, it is a significant issue to secure the radiation performance of the wireless device in a limited physical structure. Since the communication service quality is one of the most important factors for determining the device performance, there has been much research conducted to improve communication service quality, and the antenna is one of the main issues related to the communication service quality enhancement.

SUMMARY OF THE INVENTION

An aspect of the present invention is to address at least the above-mentioned problems and/or disadvantages and to provide at least the advantages described below. Accordingly, an aspect of the present invention is to provide a signal path configuration method and apparatus of a wireless device that is capable of improving radiation characteristics of the wireless device.

Also, an aspect of the present invention is to provide a signal path configuration method and apparatus of a wireless device that is capable of improving radiation characteristics of the wireless device by switching a signal path between multiple antennas according to usage environment of the device.

Another aspect of the present invention is to provide a signal path configuration method and apparatus of a wireless device that is capable of improving radiation characteristics of the wireless device by switching a signal path between multiple antennas according to whether the device is in a communication mode or a Radio Frequency (RF) calibration mode.

Still another aspect of the present invention is to provide a signal path configuration method and apparatus of a wireless device that is capable of improving radiation characteristics of the wireless device by switching the signal path between multiple antennas designated for respective operation modes, i.e. communication modes and calibration mode, according to the current operation mode.

Also, an aspect of the present invention is to provide a signal path configuration method and apparatus of a wireless device that is capable of calibrating multiple frequency bands collectively with a single signal path established to one of multiple antennas arranged at the upper and lower parts of the wireless device in an RF calibration mode.

Yet another aspect of the present invention is to provide a signal path configuration method and apparatus of a wireless device that is capable of improving radiation characteristics of the wireless device by switching selectively connecting the signal path to one the multiple antennas arranged at upper and lower parts of the wireless device according to a communication mode triggered by an event.

Still another aspect of the present invention is to provide a signal path configuration method and apparatus of a wireless device that is capable of improving communication service quality and stability by avoiding degradation of the radiation characteristics of antenna in a communication mode and calibrating multiple frequency bands supported by the wireless device collectively without additional process in the calibration mode.

In accordance with an aspect of the present invention, a wireless device including an RF unit is provided. The device includes a plurality of antennas, an RF connector for RF calibration, and a detection unit for detecting connection of an RF cable, a switch for switching a signal path to one of the plurality of antennas, and a control unit for distinguishing between communication modes based on a detection signal output by the detection unit and for generating a control signal for controlling the switch to connect the signal path to one of the antennas according to the communication mode.

In an exemplary implementation, the antennas include a first antenna which is located at a first location of the wireless device to support multiple frequency bands, and a second antenna which is located at a second location of the wireless device to support one of the multiple frequency bands. In an exemplary implementation, the first location includes a lower part of the wireless device where a microphone is located, and the second location includes an upper part of the wireless device where a speaker is located.

In accordance with another aspect of the present invention, a method for calibrating a wireless device having a plurality of antennas is provided. The method includes analyzing, when an event is detected, the event, selecting, if the event is a calibration trigger event, one of the plurality of antennas that is designated for calibration mode, establishing a signal path to the selected antenna, the selected antenna supporting multiple frequency bands of communication modes supported by the wireless device, and executing a Radio Frequency (RF) calibration for the multiple frequency bands.

In an exemplary embodiment, the wireless device comprises a first antenna that is located at a first location of the wireless device to support the multiple frequency bands, a second antenna that is located at a second location of the wireless device to support one of the multiple frequency bands, an RF connector for RF calibration, a detection unit for detecting connection of an RF cable to the RF connector, a switchplexer for separating transmit/receive signals, and a switch for switching the signal path between the first and second antennas, wherein selecting one of the antennas includes transferring a control signal instructing connection of the signal path to the first antenna via the switchplexer to the switch.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
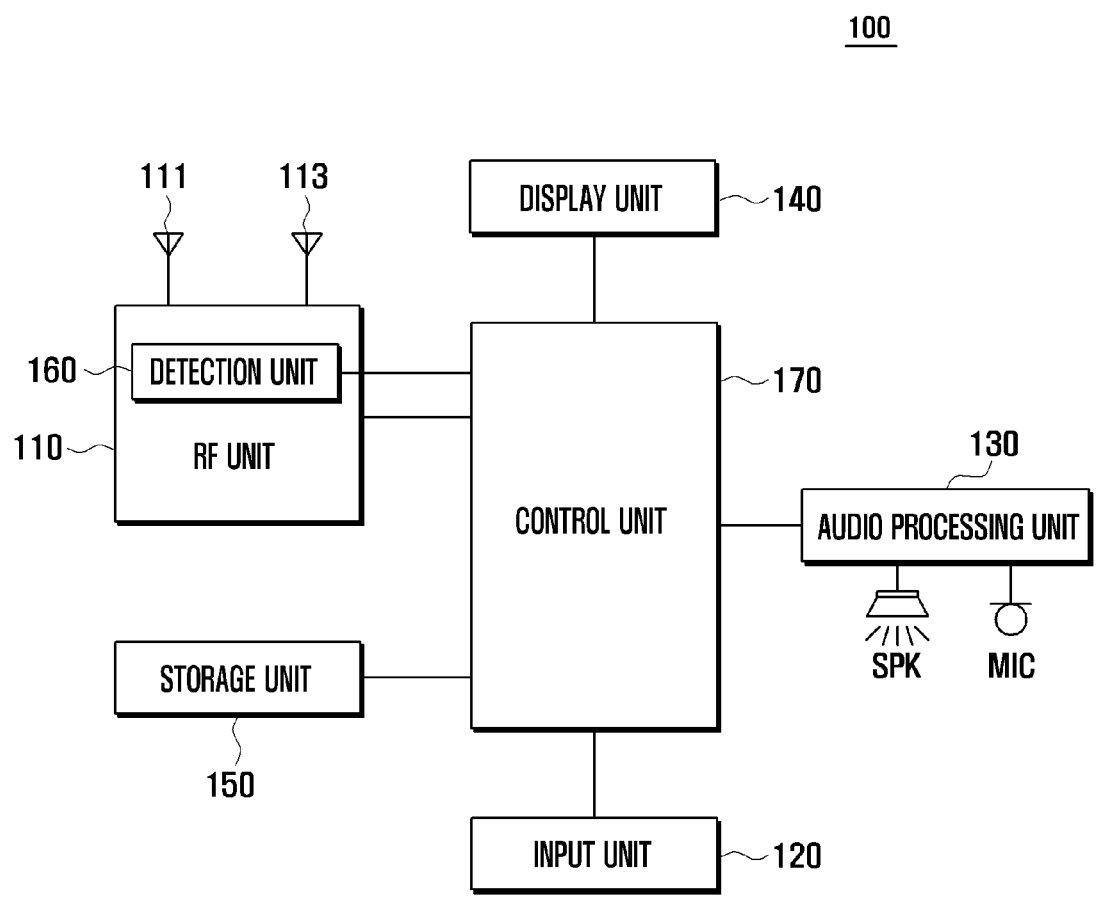
FIG. 1 is a block diagram illustrating a configuration of a wireless device according to an exemplary embodiment of the present invention.

FIG. 1 is a block diagram illustrating a configuration of a wireless device according to an exemplary embodiment of the present invention.

Referring to FIG. 1, the wireless device 100 includes a Radio Frequency (RF) unit 110, an input unit 120, an audio processing unit 130, a display unit 140, a storage unit 150, and a control unit 170. The RF unit 110 includes a first antenna 111, a second antenna 113, and a detection unit 160, and the audio processing unit 130 includes a speaker (SPK) and a microphone (MIC).

The RF unit 110 may include an RF connector (not shown) for RF calibration in an offset compensation process of the wireless device. In the above structured wireless device, the detection unit 160 detects a connection of an RF cable to the RF connector for RF calibration. The wireless device 100 establishes a signal path to one of the antennas 111 and 113 according to the detection signal output by the detection unit 160. The wireless device 100 may control the signal transmission/reception through the established signal path. The operations of individual function blocks of the wireless device 100 are described hereinafter in more detail.

The RF unit 110 is responsible for radio communication of the wireless device 100. That is, the RF unit 110 establishes a radio communication channel with a network (e.g. base station) for communicating signals related to the communication services such as voice and video communication services, Short Messaging Service (SMS), Multimedia Messaging Service (MMS), and the like. The RF unit 110 converts audio/video data and control data to radio signals to be transmitted and converts the received radio signals to audio/video data and control data. The RF unit 110 can include a transceiver for up-converting and amplifying the transmit signal and low noise amplifying and down-converting the receive signal. Although depicted with a single RF unit 110 in the drawing, the wireless device can be implemented with more than one RF unit.

More particularly, the RF unit 110 includes the first and second antennas 111 and 113 that support different frequency bands. For example, the first antenna 111 can be implemented with a length and volume for supporting frequency bands for multiple communication systems such as Global System for Mobile (GSM), Data Communication System (DCS), Personal Communication System (PCS), and Wideband Code Division Multiple Access (WCDMA). The second antenna 113 can be implemented with a length and volume for supporting a specific communication system, e.g. WCDMA. The first and second antennas 111 and 113 can be selected to establish a signal path with the control unit 170 depending on the detection signal output by the detection unit 160. A more detailed description of the RF unit 110 is made below with reference to the drawings.

The input unit 120 transfers alphanumeric data input by the user and signals generated in association with the configuration and control of the functions of the wireless device to the control unit 170. The input unit 120 includes a plurality of alphanumeric keys and function keys. The function keys may include navigation keys, side keys, shortcut keys and the like. The input unit 120 can be implemented with at least one of a touchpad, a touchscreen, a keypad (e.g. 4×3 or 3×4 keypad), and QWERTY keypad. More particularly, the input unit 110 is configured to generate an input signal activating the RF unit 110.

The audio processing unit 130 includes the speaker (SPK) for outputting the transmit/receive audio data in the form of an audible sound wave and a microphone for collecting voice and other sounds. The audio processing unit 130 can be connected to the microphone (MIC) and speaker (SPK). The audio processing unit 130 converts the voice input through the microphone (MIC) to an audio signal to be output to the control unit 170 and converts the audio signal supplied by the control unit 170 to an analog signal to be output through the speaker (SPK) in the form of an audible sound wave. The audio processing unit 130 converts the analog voice signal input through the microphone (MIC) to a digital voice signal and converts the digital voice signal output by the control unit 170 to an analog voice signal to be output through the speaker (SPK). The audio processing unit 130 also can play various audio resources (e.g. audio files such as MP3 files) stored in the wireless device in response to a user request.

More particularly, the audio processing unit 130 may output an alarm sound to notify of the antenna selected for establishing the signal path. For example, the audio processing unit 130 can be configured to output a first audio signal indicating the establishment of the signal path to the first antenna 111 and a second audio signal indicating the establishment of the signal path to the second antenna 113. The alarm sound output function can be disabled or substituted by a vibration generation function which generates different patterns of vibrations corresponding to the first and second antennas.

The display unit 140 displays screen images associated with various operations of the wireless device 100. For example, the display unit 140 may display a booting progress screen, an idle mode screen, a menu screen, a call progress screen, and the like. That is, the display unit 140 may display various screens associated with conditions and operation status of the wireless device 100. The display unit 140 may be implemented with any of a Liquid Crystal Display (LCD) panel, an Organic Light Emitting Diodes (OLED) panel, an Active Matrix OLED (AMOLED) panel, and the like. The display unit 140 may be equipped with a touchscreen. In this case, the display unit 140 may work as both the input and output devices. More particularly, the display unit 140 may display the screen image showing the call progress with the activation of the RF unit 110 and the currently activated signal path. For example, the display unit 140 may display the call progress screen with an icon or image indicating whether the signal path is established with the first antenna 111 or the second antenna 113.

The storage unit 150 may be implemented with at least one of a Read Only Memory (ROM) and a Random Access Memory (RAM). The storage unit 150 stores various kinds of data generated and used by the mobile terminal. The stored data may include all kinds of data generated while application programs are running in the wireless device 100 or received from outside (e.g., base station, other wireless device, personal computer, and the like). The storage unit 150 also may store the parameters and settings needed for the communication by means of the RF unit 110.

The storage unit 150 may include at least one buffer for buffering data generated while the mobile terminal performs specific functions. The storage unit 150 may include at least one of a memory module implanted inside of the mobile terminal and an external storage such as smartcard. The storage unit 150 may include at least one of ROM, Flash Memory, RAM, and any combined form of these storage media, e.g., Multi Chip Package (MCP) memory.

The detection unit 160 is responsible for detecting events occurring in the wireless device 100. In an exemplary embodiment of the present invention, the events may include a call trigger event for triggering entry into a communication mode and a calibration trigger event for triggering entry into an RF calibration mode. The detection unit 160 may generate a detection signal for notifying of the RF calibration mode entry. In an exemplary implementation, the detection unit 160 may detect the connection of an RF cable to the RF connector of the RF unit. If the connection of the RF cable is detected, the detection unit 160 outputs the detection signal to the control unit 170. The control unit 170 recognizes the RF calibration mode entry upon receipt of the detection signal so as to generate a control signal for establishing the signal path in the RF calibration mode. The wireless device 100 can be configured to use the communication path (i.e., antenna) designated for the RF calibration mode based on the detection signal. Although illustrated in FIG. 1 as a separate component, the detection unit 160 may be incorporated into the RF connector as an additional component of the RF unit 110.

The control unit 170 controls operations of the wireless device 100 and signaling among internal function blocks of the wireless device 100. The control unit 170 controls signaling among the RF unit 110, the input unit 120, the audio processing unit 130, the display unit 140, the storage unit 150, and the detection unit 160.

More particularly, the control unit 170 analyzes events occurring in the wireless device 100 and executes functions related to the events. For example, if a call trigger event is detected, the control unit 170 performs a call process according to one of the communication technologies that the wireless device 100 supports. At this time, the control unit 170 generates a control signal to establish a signal path to the second antenna 113 and controls transmission/reception of the signals through the established signal path. The second antenna 113 can be an antenna implemented to support stable and high quality communication service by avoiding loss of antenna radiation characteristics. In accordance with an exemplary embodiment of the present invention, the wireless device 100 can be configured such that, although multiband communications are supported, it uses the second antenna 113 as the main antenna for basic communications to guarantee stable radiation performance and the first antenna 111 to establish a signal path selectively in response to the user request or in correspondence to a supportable communication network.

If the event is a calibration trigger event, the control unit 170 controls such that the signal path is established to the first antenna 111 based on the detection signal from the detection unit 160 and controls signal transmission/reception with the RF calibration on the entire multiple bands supported by the wireless device 100.

For example, if the calibration mode is activated according to the connection of an RF cable to the RF connector for RF calibration, the detection unit 160 detects the connection of the RF cable and outputs the detection signal to the control unit 170. Upon receipt of the detection signal, the control unit 170 recognizes the calibration mode entry of the wireless device 100 and generates a control signal for establishing the signal path to the first antenna 111.

The control signal generated by the control unit 170 may be transferred to a switch for switching between the first and second antennas 111 and 113. The switch can establish the signal path to one of the first and second antennas 111 and 113 selectively based on the control signal received from the control unit 170. A more detailed description on the operations of the switch is made later.

In accordance with an exemplary embodiment of the present invention, the signal path to the first antenna 111 can be implemented for the GSM/DCS/PCS/WCDMA bands requiring relatively large space at the lower part of the wireless device 100, and the signal path to the second antenna 113 can be implemented with relatively small space at the upper part of the wireless device 100 so as to avoid radiation performance degradation caused by a grip of user's hand. A more detailed description on the signal path configuration is made later.

The control unit 170 can control the entire operations that are described hereinafter with reference to FIGS. 2 to 5.

Although depicted schematically in FIG. 1 for simplifying the explanation, the wireless device of the present invention is not limited to configuration of FIG. 1.

For example, the control unit 170 may further include a baseband module for processing radio signals of wireless communication service. The baseband module can be integrated into at least one of the control unit 170 and the RF unit 110 or may be separately implemented from the control unit 170 and the RF unit 110.

Although not depicted in FIG. 1, the wireless device 100 may further include at least one of a camera module for taking a picture of a subject, a local area network module for supporting local area network communication, an Internet access module for supporting Internet accessing, a digital broadcast module for receiving and playing digital broadcast data such as Digital Multimedia Broadcasting (DMB) and Digital Video Broadcasting (DVB) data, and a short range wireless communication module such a Bluetooth module for short range wireless communication.

Although not enumerated here, other devices equivalent to the aforementioned function modules can be further included in the mobile terminal. Also, it is obvious to those skilled in the art that each of the internal function blocks constituting the wireless device 100 can be omitted or replaced by other equivalent devices.

Figure 2:
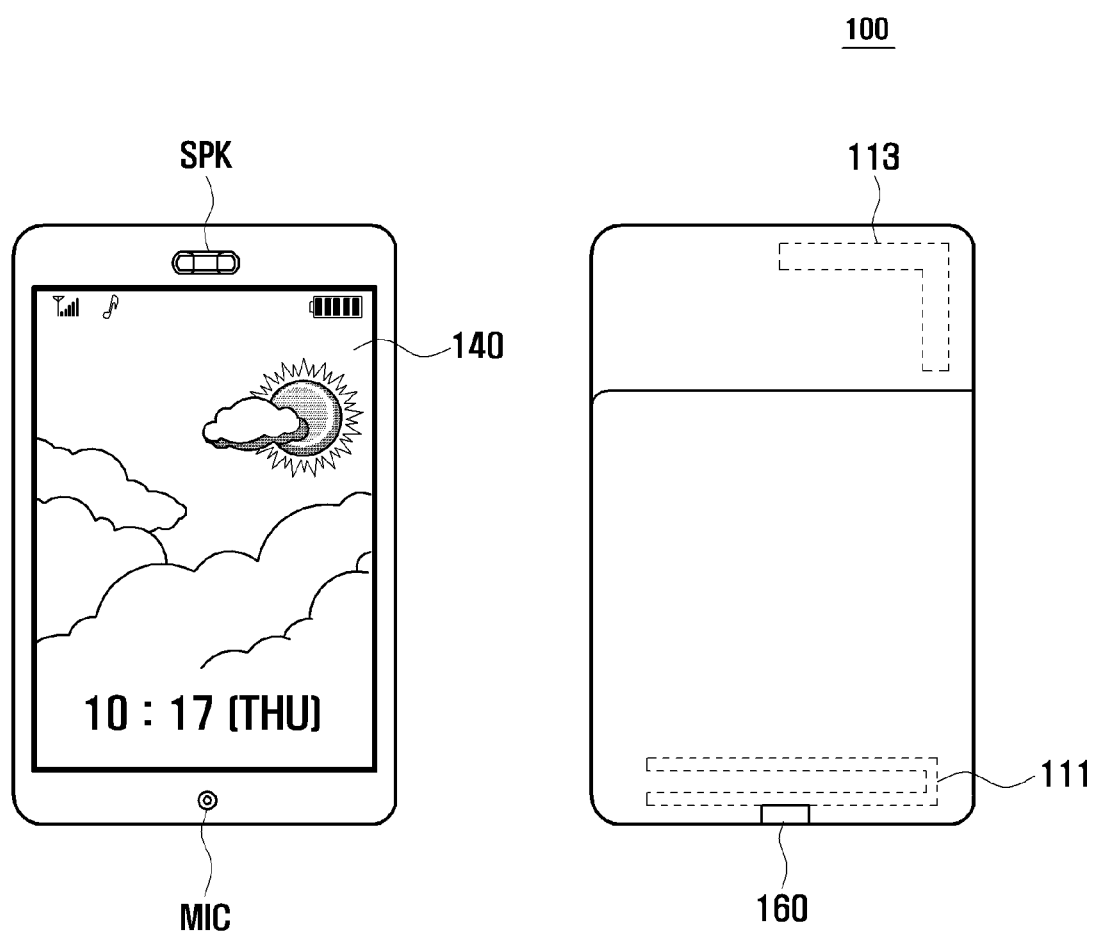
FIG. 2 is a diagram illustrating front and rear views of a wireless device according to an exemplary embodiment of the present invention.

FIG. 2 is a diagram illustrating front and rear views of a wireless device according to an exemplary embodiment of the present invention.

Referring to FIG. 2, a display unit 140 is arranged over the front surface of a wireless device 100, and a speaker (SPK) and a microphone (MIC) are arranged at the top and bottom of the display unit 140 respectively. Typically, a user holds the wireless device by the lower part of the device casing such that the SPK and the MIC are placed close to the ear and mouth respectively regardless of whether the user is left-handed or right-handed. Accordingly, the casing of the wireless device 100 is typically gripped by the user's hand around the portion where the microphone is located.

The rear surface of the wireless device 100 can be divided into three parts: an upper part where the speaker and a camera module are arranged, a middle part where the battery is arranged, and a lower part where the microphone and detection unit are arranged. In addition to this configuration, the first antenna 111 is arranged at the lower part inside the casing, and the second antenna 113 is arranged at the upper part inside the casing.

The first antenna 111 can be implemented as a multiband antenna for supporting multiple communication modes such as GSM, DCS, PCS, and WCDMA. In order to cover both the relatively low frequency bands and high frequency bands, the first antenna 111 is required to be implemented with the relatively long length and large volume for the low frequency bands. In an exemplary embodiment, the first antenna is arranged at the lower part of the wireless device where the microphone is located.

Since the upper part of the wireless device 100 is filled with the camera module and speaker (SPK), it is not easy to secure enough space to install an antenna. Furthermore, since the camera module and speaker (SPK) are metallic components that are likely to degrade the radiation characteristics of an antenna, it is required to locate an antenna at a distance from these components. That is, the wireless device 100 has little space for installing an antenna at the upper part as compared to the lower part.

Accordingly, in an exemplary implementation, the second antenna 113 is implemented with a short length and a small volume as compared to the first antenna 111. That is, the second antenna 113 is implemented with a short length and a small volume for transmitting/receiving high frequency band signals as compared to the first antenna which is implemented for transmitting/receiving low frequency band signals. For example, the first antenna 111 can be implemented to support the GSM, DCS, and PCS frequency bands while the second antenna 113 is implemented to support the WCDMA frequency band which is higher than those of the GSM, DCS, and PCS. In accordance with an exemplary embodiment of the present invention, the first antenna 111 can be implemented to support multiple frequency bands including that supported by the second antenna 113 in order to perform the radiation performance calibration of the wireless device 100 only with a single signal path.

As aforementioned, the first and second antennas 111 and 113 can be installed separately at the lower and upper parts of the wireless device 100. In an exemplary implementation, the first antenna 111 is implemented to support a low frequency band or multiple frequency bands including a low frequency band, and the second antenna 113 is implemented to support a high frequency band. For this reason, the second antenna 113 may be implemented with relatively short length and small volume as compared to the first antenna 111.

The detection unit 160 may be included as an additional circuit component for detecting connection of an RF cable to the RF connector formed on the signal path to the first antenna 111. If the connection of an RF cable is detected, the detection unit 160 generates a detection signal such that the wireless device 100 enters the calibration mode for RF calibration. In the calibration mode, the wireless device 100 performs a calibration process for all frequency bands that it supports. Since the calibration process is performed for all frequency bands supported by the wireless device 100 with the RF connector connected to the first antenna and its signal path, there is no need to perform a separate RF calibration for the frequency band supported by the second antenna 113. The RF calibration process is described later in more detail.

Figure 3:
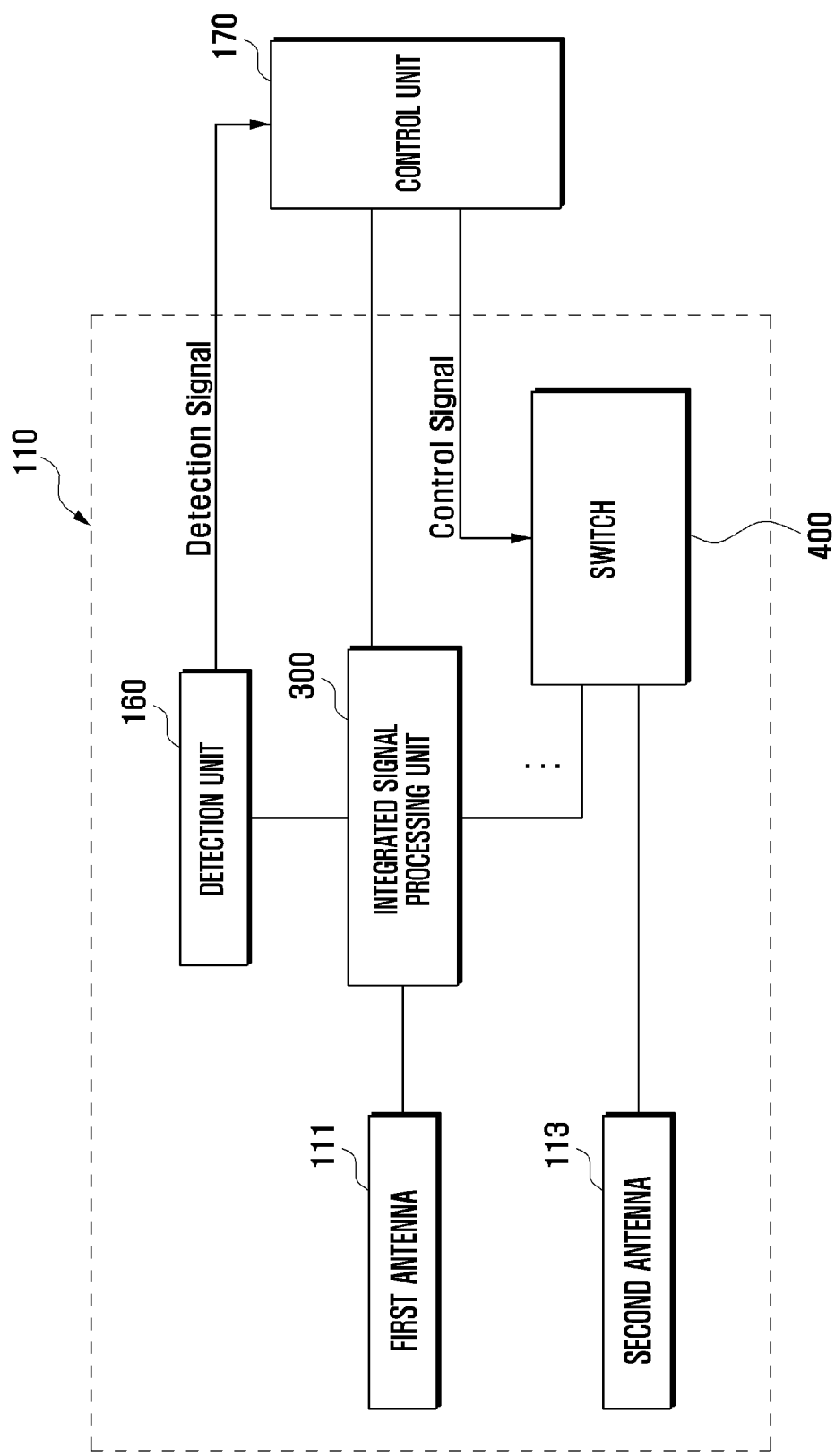
FIG. 3 is a block diagram illustrating a configuration of an Radio Frequency (RF) unit according to an exemplary embodiment of the present invention.

FIG. 3 is a block diagram illustrating a configuration of an RF unit according to an exemplary embodiment of the present invention.

Referring to FIG. 3, the RF unit 110 a first antenna 111, a second antenna 113, a detection unit 160, an integrated signal processing unit 300, and a switch 400. The integrated signal processing unit 300 and the switch 400 can operate under the control of a control unit 170.

The switch 400 is responsible for switching the signal path, according to the control unit 170, between the first and second antennas 111 and 113 and can be implemented with an analog switch. That is, the switch 400 establishes the signal path to one of the first and second antennas 111 and 113 according to the control signal output by the control unit 170. When the signal path is connected to the first antenna 111, the integrated signal processing unit 300 can be placed on the signal path between the first antenna 111 and the switch 400. In this manner, the switch 400 is responsible for establishing the signal path to one of the first and second antennas 111 and 113 selectively.

Although not illustrated, the RF connector can be installed between the first antenna 111 and the integrated signal processing unit 300. The RF connector can support the antenna characteristics test process by separating the first antenna 111 and the integrated signal processing unit 300. In case of using the RF connector, the designer of the wireless device 100 can perform unique characteristic tests and gross RF calibrations for all frequency bands supported by the wireless device using the RF connector. That is, when the wireless device 100 enters the calibration mode upon detection of the connection of an RF cable, the control unit 170 outputs a control signal to the switch 400 according to the detection signal output by the detection unit 160 such that the switch 400 establishes the signal path to the first antenna 111 for the RF calibration process. Accordingly, the designer can perform the RF calibration of the second antenna 113 as well as the RF calibration of the first antenna 111 quickly in integral manner only with the first antenna 111 and the signal path to the first antenna 111.

The integrated signal processing unit 300 can be implemented to transmit and receive signals through the signal path, i.e. antenna, connected by means of the switch 400. The integrated signal processing unit 300 can include an up-converter for up-converting and amplifying the transmit signal and a down-converter for low noise amplifying and down-converting the receive signal. The down converter low noise amplifies and down-converts the frequency of the signal received with the activation of the receive function of the wireless device 100 and outputs the down-converted signal to the control unit 170. The up converter up-converts and amplifies the frequency of the transmit signal with the activation of the transmit function of the wireless device 100 and transmits the signal through a specific antenna connected by means of the switch 400.

In a case in which the wireless device 100 supports multiple communication modes, the integrated signal processing unit 300 can include as many amplifiers as the number of supportable communication modes (e.g. GSM amplifier and WCDMA amplifier). In a case in which the wireless device 100 supports the WCDMA mode, the integrated signal processing unit 300 also can further include a WCDMA duplexer. In a case in which the wireless device 100 supports multiple communication modes, the integrated signal processing unit 300 can include a switchplexer for separating the transmit/receive signals of specific communication mode. Although the integrated signal processing unit 300 is depicted as a single component supporting multiple communication technologies, multiple communication chips for supporting individual communication modes can be installed. In this case, the control unit 170 can control the signal transmission and reception by activating the signal lines connected to the communication chips and a specific communication chip selected by the user or as a default.

The control unit 170 controls the RF unit 110 to perform demodulation and decoding on the receive signal and modulation and encoding on the transmit signal. The control unit 170 generates the control signal for establishing a signal path to one of the first and second antennas 111 and 113 according to the detection signal and transfers the control to the switch 400. The control unit 170 can generate a control signal for establishing a signal path to one of the first and second antennas 111 and 113 that supports the communication mode selected by the user, as a default, or as supported by the network.

In an exemplary implementation, it is assumed that the first antenna 111 is designed to support the integrated frequency band for multiple communication modes, the second antenna 113 is designed to support a high frequency band, and the characteristics test for the first antenna 111 of the wireless device 100, i.e. the RF connector for the RF calibration, is activated. Here, the activation of the RF connector can be done when the RF cable is connected to the RF connector for RF calibration. If the detection signal indicating the detection of the connection of the RF cable to the RF connector is received from the detection unit 160, the control unit 170 recognizes the calibration mode entry of the wireless device 100 and controls to establish the signal path to the first antenna 111.

If a communication function activation request signal (e.g. outgoing call request) is detected, the control unit 170 recognizes the communication mode entry of the wireless device 100 and controls to establish the signal link to the second antenna 113. At this time, the control unit 170 can control to establish the signal path to the first antenna 111 supporting the communication mode according to the user's selection, as a default mode, or as supported by the network.

In case no communication mode is designated for the communication mode entry, the signal path is established to the second antenna 113 for providing a stable and high quality communication service by avoiding the loss of antenna radiation characteristics. That is, in accordance with an exemplary embodiment of the present invention, the second antenna 113 is selected as default in the communication mode to provide a stable and high quality communication service by avoiding the loss of antenna radiation characteristics. In the calibration mode, all frequency bands supported by the wireless device 100 can be calibrated collectively without RF connector and link path establishment for additional RF calibration process of the second antenna 113.

It is possible that the user makes/receives a call without holding the wireless device 100 by the hand. In other words, when the user makes a call by means of an earphone or a wireless headset without holding the wireless device 100 by the hand, there is no influence on the antenna caused by the user's hand. In this case, there is no detection signal from the detection unit 160 and, as a consequence, the signal path is established to the second antenna 113 in the communication mode. The sensitivity of the first and second antennas 111 and 113 is influenced by the casing space and, even though the second antenna 113 is designed for a high frequency band inside the upper part of the casing of the wireless device 100, its installation space is not as large as that for the first antenna 111 at the upper part.

In case that the first antenna 111 is implemented to support integrated multiple bands including a high frequency band supported by the second antenna 113, the first antenna 111 can show superior performance as compared to the second antenna 113. Accordingly, if there is no influence caused by the user's hand, it is preferred to establish the signal path to the first antenna 111 to improve the communication service quality. A description is made with reference to following tables.

TABLE 1

|  | First antenna | Second antenna |
|---|---|---|
| Mute rate | 67% | 27% |
| Transmission success rate | 44% | 100% |
| Reception success rate | 54% | 100% |

Table 1 shows the mute rates, transmission success rates, and reception success rates of the first and second antennas 111 and 113 of the wireless device 100 in which the first antenna 111 is arranged at the lower part of the wireless device 100 and the second antenna 113 is arranged at the upper part of the wireless device 100, when the user holds the low part of the wireless device 100 by the hand. As shown in Table. 1, if the lower part of the device 100 is held by the user's hand, the transmission success rate and reception success rate are lower in the first antenna 111 than in the second antenna 113 whereas the mute rate is lower in the second antenna 113 than in the first antenna 111.

TABLE 2

|  |  | Hands Free Low end of antenna | | Hand Held Low end of antenna | |
| --- | --- | --- | --- | --- | --- |
|  |  | TIS | TRP | TIS | TRP |
| WCDMA BAND | Measure 1 | −105 dBm | 20 dBm | −98 dBm | 14 dBm |
|  | Measure 2 | −104 dBm | 20 dBm | −97 dBm | 13 dBm |
|  | Measure 3 | −105 dBm | 19 dBm | −96 dBm | 14 dBm |

Table 2 shows the Total Isotropic Sensitivity (TIS) and Total Radiated Power (TRP) of the first antenna 111 that are measured when the first antenna 111, installed at the lower part of the wireless device 100, is used in the WCDMA band. In the measurement result, a lower TIS and a higher TRP indicate a higher communication service quality. As shown in Table 2, both the TIS and TRP are higher in the hands free state where there is no influence from the user's hand by as much as 6 dB as compared to the hand held state in which there is influence from the user's hand.

TABLE 3

|  |  | Hands Free | | | | Hand Held | | | |
| --- | --- | --- | --- | --- | --- | --- | --- | --- | --- |
|  |  | Antenna 2 | | Antenna 1 | | Antenna 2 | | Antenna 1 | |
|  |  | TIS | TRP | TIS | TRP | TIS | TRP | TIS | TRP |
| WCDMA BAND | Measure 1 | −105 dBm | 20 dBm | −105 dBm | 20 dBm | −102 dBm | 18 dBm | −98 dBm | 14 dBm |
|  | Measure 2 | −103 dBm | 20 dBm | −104 dBm | 20 dBm | −102 dBm | 18 dBm | −97 dBm | 13 dBm |
|  | Measure 3 | −104 dBm | 19 dBm | −105 dBm | 19 dBm | −103 dBm | 18 dBm | −96 dBm | 14 dBm |

Table 3 shows the measurement results of the characteristics of the transmit/receive signals at the first and second antennas 111 and 113 in both the hands free and hand held states when the first and second antennas 111 and 113 are used in the WCDMA band. In the measurement result, a lower TIS and a higher TRP indicate a higher communication service quality. As shown in Table 3, the characteristics of the second antenna 113 improve as much as 5 dB compared to the characteristics of the first antenna 111 in the hand held state when there is influence from the user's hand. Accordingly, it is advantageous to use the second antenna 113 in the hand held state. The measurement results also show that the characteristics of the second antenna 113 are approximately the same in the hands free state as those of the first antenna 111. Thus, there is little difference in communication service quality between use of the first antenna 111 or the second antenna 113 in the hands free state.

As described above, the wireless device 100 according to an exemplary embodiment of the present invention can be configured to operate in the communication mode with the signal path connected to the second antenna 113 which is not influenced by the grip of user's hand, when the user holds the wireless device 100 by the hand, resulting in maintenance of high communication service quality. Also, the wireless device 100 according to an exemplary embodiment of the present invention is capable of performing RF calibration on all frequency bands supported by the wireless device 100 in a collective manner by establishing the signal path to the first antenna 111. This means that the signal path is established with the first antenna 111, in the RF calibration process, which supports all frequency bands supported by the wireless device 100, thereby facilitating RF calibration on all frequency bands including the frequency band supported by the second antenna 113 quickly without separate RF calibration for the second antenna 113.

Figure 4:
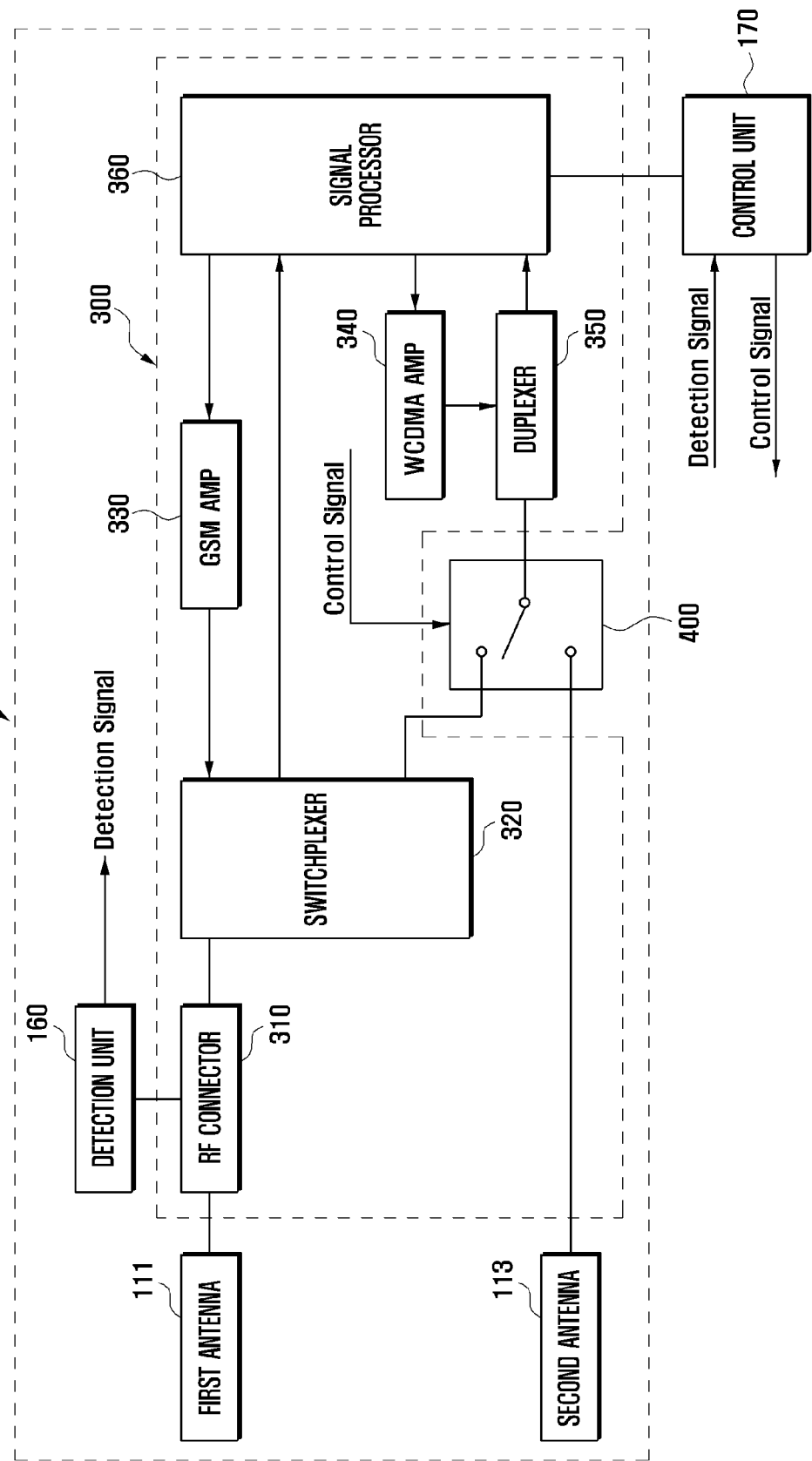
FIG. 4 is a block diagram illustrating a detailed configuration of an RF unit according to an exemplary embodiment of the present invention.

FIG. 4 is a block diagram illustrating a detailed configuration of an RF unit according to an exemplary embodiment of the present invention.

Referring to FIG. 4, the RF unit 110 includes a first antenna 111, a second antenna 113, a detection unit 160, an integrated signal processing unit 300, and a switch 400. The switch 400 connects the signal path selectively to one of the first and second antennas 111 and 113.

The integrated signal processing unit 300 can include a switchplexer 320 connected to the first antenna 111, a GSM amplifier (AMP) 330, a WCDMA AMP 340, a duplexer 350, and a signal processor 360. Between the first antenna 111 and a switchplexer 320, an RF connector 310 can be arranged. The RF connector 310 can be used for supporting the RF calibration process.

The signal processor 360 can include an up-converter for up-converting and amplifying the frequency of the transmit signal and a down-converter for low noise amplifying and down-converting the frequency of the received signal. The GSM AMP 330 amplifies the GSM signal output by the signal processor 360 and transfers the amplified GSM signal to the switchplexer 320. The WCDMA AMP 340 is arranged between the duplexer 350 and the signal processor 360 to amplify the WCDMA signal output by the signal processor 360, and the duplexer 350 controls the transmit/receive timings of the WCDMA signal.

The switch 400 is arranged between the duplexer 350 and the switchplexer 320 and manages the first antenna 111, i.e. relays the signal between the switchplexer 320 and the duplexer 350 in the calibration mode. The switch 400 also can manage the second antenna 113, i.e. establish the signal path for signal relay between the duplexer 350 and the second antenna 113 in the communication mode.

The switchplexer 320 is responsible for separation of the signals to and from the first antenna 111 according to the current communication mode of the wireless device 100. More particularly, the switchplexer 320 is responsible for separation of transmit/receive signals for performing the RF calibration on all frequency bands collectively in the calibration mode in association with the first antenna 111. This means that the switchplexer 320 can perform transmit/receive signal separation on the frequency band supported by the second antenna 113.

A control unit 170 generates the control signal for on/off of the switch 400 to establish the signal path to the first antenna 111 according to the detection signal received from the detection unit 160. The integrated signal processing unit 300 supports signal transmission/reception of a specific communication mode (e.g. WCDMA mode) using the second antenna 113 with the previously established signal path via the switchplexer 320 in the RF calibration mode. Accordingly, it is possible to perform RF calibration on all frequency bands collectively without adding an individual RF connector and switchplexer for RF calibration for the second antenna 113. The integrated signal processing unit 300 can support the signal transmission/reception of the WCDMA mode with the second antenna 113 without involvement of the switchplexer 320 such that it is possible to avoid the signal attenuation by the switchplexer 320, resulting in improvement of communication service quality.

As described above, the wireless device 100 according to an exemplary embodiment of the present invention is provided with a direct signal path for supporting a specific communication mode with the second antenna 113 which is implemented to reduce the radiation performance degradation caused by the grip of a user's hand, such that it is possible to minimize unnecessary signal attenuation. The wireless device 100 also is provided with an integrated signal path for supporting all communication modes of the wireless device 100 with the first antenna in the RF calibration process according to the detection signal received from the detection unit, such that it is possible to facilitate and simplify the RF calibration process.

A description is made of a method for controlling the operations of the above structured wireless device 100 according to an exemplary embodiment of the present invention. However, the operations of the wireless device 100 of the present invention are not limited to the following description but can be modified in various other exemplary embodiments of the present invention.

Figure 5:
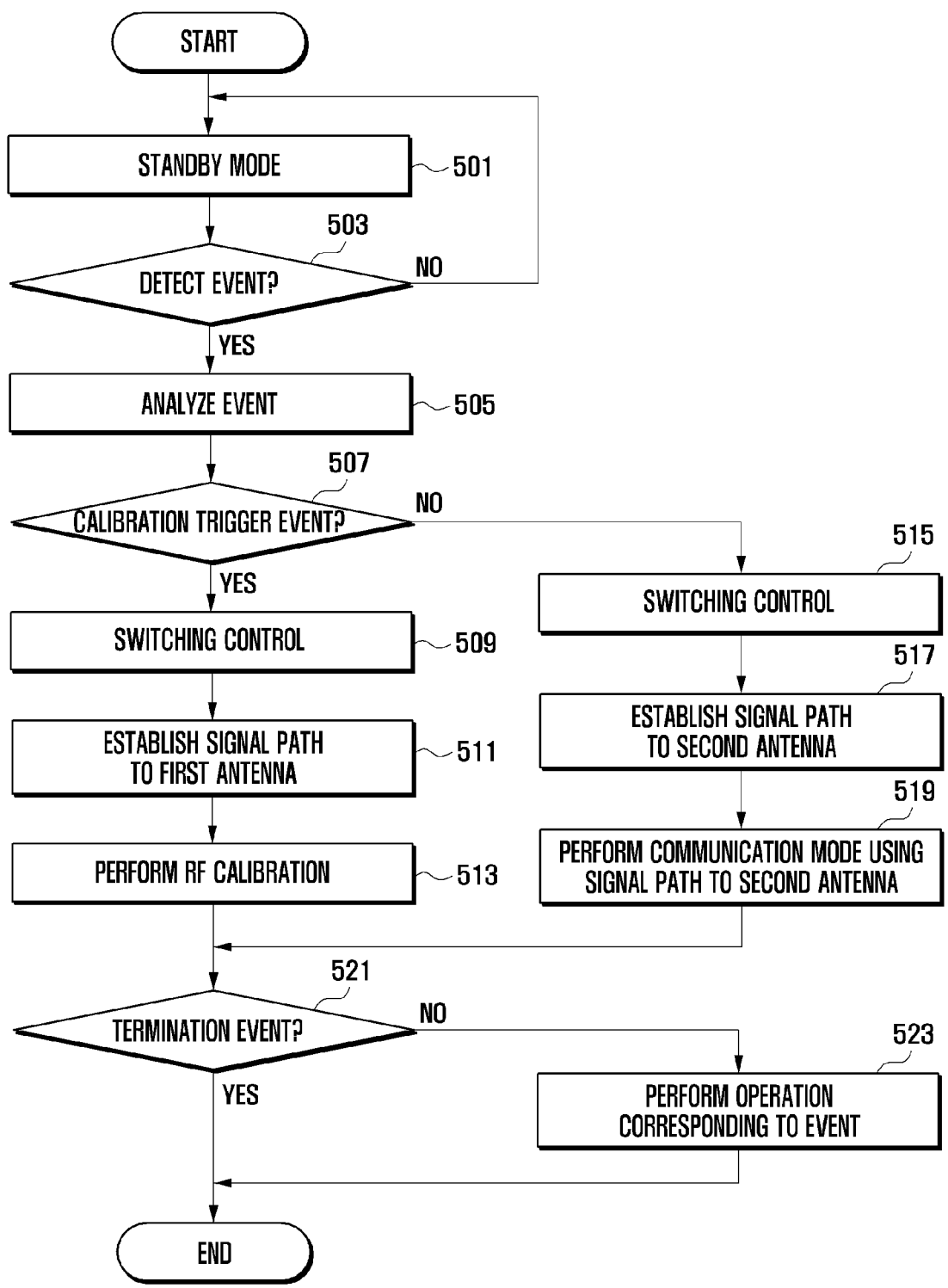
FIG. 5 is a flowchart illustrating a method for controlling the operations of a wireless device according to an exemplary embodiment of the present invention.

FIG. 5 is a flowchart illustrating a method for controlling operations of a wireless device according to an exemplary embodiment of the present invention.

Referring to FIG. 5, the control unit 170 detects that the wireless device 100 is in standby mode in step 501 and monitors to detect an event occurring in the wireless device in step 503. If an event is detected, the control unit 170 analyzes the event in step 505 and determines whether the event is a calibration trigger event in step 507. In FIG. 5, it is assumed that the event can be one of a calibration trigger event for triggering entry into a calibration mode and a call trigger event for triggering entry into a communication mode. The calibration trigger event is generated when the detection signal is received from the detection unit 160.

Accordingly, the control unit 170 analyzes the event in step 505 and determines whether the event is generated by the detection signal received from the detection unit 160 at step 507. The control unit 170 can determine whether the event is the calibration trigger event or the call trigger event based on whether the detection signal is received.

If it is determined in step 507 that the event is the calibration trigger event, the control unit 170 controls the switch for the calibration mode in step 509. That is, the control unit 170 outputs a control signal for establishing the signal path to the first antenna to the switch 400. In step 511, the control unit 170 controls to establish the signal path to the first antenna 111. Next, the control unit 170 controls to perform the RF calibration on all frequency bands supported by the wireless device 100 in accordance with the user's manipulation in step 513.

While performing the RF calibration process, the control unit 170 monitors to detect an event and determines, if any event is detected, whether the event is a calibration mode termination event in step 521. The calibration mode termination event can be generated when the detection signal flow stops due to the detachment of the RF cable from the RF connector 310 or a detection signal indicating the detachment of the RF cable is detected. If the calibration mode termination event is detected, the control unit 170 ends the RF calibration process. Otherwise, if the event is not the calibration mode termination event, the control unit 170 performs an operation corresponding to the event in step 523.

Returning to step 507, if it is determined that the event is the call trigger event, in other words not the calibration trigger event, the control unit 170 controls the switch for the communication mode in step 515. That is, the control unit 170 outputs a control signal for establishing the signal path to the first antenna 111 or the second antenna 113 to the switch 400. In FIG. 5, it is assumed that the communication mode is executed with the second antenna 113 which is additionally prepared for securing the antenna radiation performance. That is, the second antenna 113 is the antenna implemented such that its radiation performance is not influenced by the grip of user's hand, i.e. arranged at the upper part of the wireless device 100, for example where a speaker (SPK) is arranged. In step 517, the control unit 170 controls to establish the signal path to the second antenna 113 and in step 519 performs the communication mode using the signal path to the second antenna.

While performing the communication mode, the control unit 170 monitors to detect an event and determines, if any event is detected, whether the event is a communication mode termination event in step 521. The communication mode termination event can be generated when a communication mode termination request is input by the user or the signal stream from the network stops. If the communication mode termination event is detected, the control unit 170 ends the RF calibration process. Otherwise, if the event is not the communication mode termination event, the control unit 170 performs an operation corresponding to the event in step 523.

Although the description has been made under the assumption that the first antenna 111 is implemented to cover all frequency bands supported by the wireless device 100 and the second antenna 113 is implemented to cover a single specific frequency band, the present invention is not limited thereto. For example, the second antenna 113 can be implemented to cover one or more frequency bands. In this case, the second antenna 113 is preferably designed with a length and volume appropriate for the all of the frequency bands in consideration of the installation space.

As described above, the signal path configuration method and apparatus of the wireless device according to exemplary embodiments of the present invention are capable of performing the RF calibration for all frequency bands supported by the wireless device with a single signal path established to one of two antennas respectively arranged at upper and lower parts of the wireless device, thereby reducing RF calibration time and device fabrication time. Also, the signal path configuration method and apparatus of the wireless device according to exemplary embodiments of the present invention are capable of performing the RF calibration for all frequency bands supported by the wireless device using the signal path established via a switchplexer without separate RF calibration for a specific frequency band supported by another antenna. In the signal path configuration method and apparatus of the wireless device according to exemplary embodiments of the present invention, when the wireless device enters a communication mode, it can establish a signal path to the antenna arranged at the upper part of the wireless device without involvement of the switchplexer, resulting in improvement of communication quality and performance.

That is, the signal path configuration method and apparatus of the wireless device according to exemplary embodiments of the present invention advantageously improve signal transmission and reception performance using multiple antennas arranged separately at different parts of the wireless device. Also, the signal path configuration method and apparatus of the wireless device according to exemplary embodiments of the present invention are capable of reducing the device development time and improving communication quality and performance, resulting in reduction of network investment cost.

The above-described methods according to the present invention can be realized in hardware or as software or computer code that can be stored in a recording medium such as a Compact Disc (CD) Read Only Memory (ROM), a Random Access Memory (RAM), a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A wireless device comprising:
    a Radio Frequency (RF) unit that includes a plurality of antennas, an RF connector for RF calibration, and a detection unit for detecting connection of an RF cable;
    a switch for switching a signal path to one of the plurality of antennas; and
    a control unit for distinguishing between communication modes based on a detection signal output by the detection unit and for generating a control signal for controlling the switch to connect the signal path to one of the antennas according to the communication mode,
    wherein the plurality of antennas comprises:
        a first antenna located at a first location of the wireless device to support multiple frequency bands; and
        a second antenna located at a second location of the wireless device to support one of the multiple frequency bands.

2. The wireless device of claim 1, wherein the first location of the wireless device comprises a lower part of the wireless device where a microphone is located, and the second location of the wireless device comprises an upper part of the wireless device where a speaker is located.

3. The wireless device of claim 1, wherein the RF connector is arranged between the first antenna and a switchplexer, and the switch connects the signal path to one of the first antenna via the switchplexer and the second antenna directly according to the control signal.

4. The wireless device of claim 3, wherein the control unit generates, when the detection signal is received from the detection unit, the control signal for triggering entry into a calibration mode, and the switch connects the signal path to the first antenna according to the control signal.

5. The wireless device of claim 4, wherein the control unit controls, when the wireless device is configured to operate in one of the communication modes of the multiple frequency bands, the switch to connect the signal path to the first antenna.

6. The wireless device of claim 3, wherein the control unit generates, when a call mode request signal is detected, the control signal for triggering entry into a call mode, and the switch connects the signal path to one of the first and second antennas according to a communication mode indicated by the control signal.

7. The wireless device of claim 6, wherein the control unit determines the communication mode indicated by the call mode request signal and generates the control signal instructing to connect the signal path to one of the first and second antennas which is designated for the determined communication mode.

8. The wireless device of claim 3, wherein the control unit generates, when the call mode request signal is detected, the control signal for triggering entry into a call mode, and the switch connects the signal path to the second antenna according to the control signal.

9. The wireless device of claim 8, wherein the control unit controls, when the wireless device is configured to operate in the communication mode of a specific frequency band, the switch to isolate the switchplexer and connect the signal path to the second antenna.

10. The wireless device of claim 1, wherein the second antenna is connected to a signal path for communication when a user grips the wireless device.

11. A method for calibrating a wireless device having a plurality of antennas, the method comprising:
    analyzing, when an event is detected, the event;
    selecting, if the event is a calibration trigger event, one of the plurality of antennas that is designated for calibration mode;
    establishing a signal path to the selected antenna, the selected antenna supporting multiple frequency bands of communication modes supported by the wireless device; and
    executing a Radio Frequency (RF) calibration for the multiple frequency bands,
    wherein the wireless device comprises a first antenna which is located at a first location of the wireless device to support the multiple frequency bands, a second antenna which is located at a second location of the wireless device to support one of the multiple frequency bands.

12. The method of claim 11, wherein the wireless device further comprises an RF connector for RF calibration, a detection unit for detecting connection of an RF cable to the RF connector, a switchplexer for separating transmit/receive signals, and a switch for switching the signal path between the first and second antennas, wherein the selecting of the one of the plurality of antennas comprises transferring a control signal instructing connection of the signal path to the first antenna via the switchplexer to the switch.

13. The method of claim 12, wherein the first location of the wireless device comprises a lower part of the wireless device where a microphone is located, and the second location of the wireless device comprises an upper part of the wireless device where a speaker is located.

14. The method of claim 13, wherein the event comprises one of a call trigger event for triggering entry into a call mode and a calibration trigger event for triggering entry into a calibration mode for the RF calibration of the wireless device.

15. The method of claim 14, wherein the calibration trigger event occurs in response to the detection signal generated by the detection unit.

16. The method of claim 13, further comprising outputting, if the event is a call trigger event, a control signal for connecting the signal path to one of the first and second antennas according to the communication mode designated for the call requested by the call trigger event to the switch.

17. The method of claim 12, wherein the multiple frequency bands supported by the first antenna include the frequency band supported by the second antenna.

18. A method for operating a mobile terminal that includes a plurality of antennas, the method comprising:
- determining if a calibration trigger event occurs;
- if it is determined that the calibration event occurs, outputting a control signal for switching to a first of the plurality of antennas;
- performing a Radio Frequency (RF) calibration on all frequencies supported by the first antenna;
- outputting a control signal for switching to a second of the plurality of antennas if it is determined that the calibration event does not occur; and
- performing communication using the second antenna.

19. The method of claim 18, wherein the determining if the calibration trigger event occurs comprises detecting connection of an RF cable to the mobile terminal.

* * * * *